United States Patent [19]

Spears

[11] Patent Number: 5,429,411

[45] Date of Patent: * Jul. 4, 1995

[54] CONTROLS FOR TRACTOR-TRAILER AIR DEFLECTOR SYSTEM

[75] Inventor: Dan E. Spears, Brandon, Fla.

[73] Assignee: Aero-Brake Limited Liability Company, Winter Haven, Fla.

[*] Notice: The portion of the term of this patent subsequent to Mar. 3, 2009 has been disclaimed.

[21] Appl. No.: 833,420

[22] Filed: Feb. 10, 1992

Related U.S. Application Data

[63] Continuation-in-part of Ser. No. 545,989, Jun. 29, 1990, Pat. No. 5,092,648, which is a continuation-in-part of Ser. No. 392,019, Aug. 10, 1989, abandoned.

[51] Int. Cl.⁶ .............................................. B62D 35/00
[52] U.S. Cl. ................... 296/180.1; 296/180.3; 303/2
[58] Field of Search ............... 296/180.1, 180.2, 180.3, 296/180.5; 188/270, 273; 303/2; 180/903

[56] References Cited

U.S. PATENT DOCUMENTS

| | | |
|---|---|---|
| 2,863,695 | 12/1958 | Stamm . |
| 4,149,618 | 4/1979 | Horie ................................ 188/273 |
| 4,156,543 | 5/1979 | Taylor et al. . |
| 4,208,197 | 6/1980 | Yakimowich et al. . |
| 4,214,786 | 7/1980 | Morrison . |
| 4,408,792 | 10/1983 | Sullivan . |
| 4,607,874 | 8/1986 | Peairs . |
| 4,611,796 | 9/1986 | Orr . |
| 4,693,506 | 9/1987 | Massengill . |
| 4,703,970 | 11/1987 | Gorka . |
| 4,824,165 | 4/1989 | Fry . |
| 4,867,499 | 9/1989 | Stephan et al. . |

FOREIGN PATENT DOCUMENTS

| | | |
|---|---|---|
| 266893 | 5/1988 | European Pat. Off. . |
| 150582 | 9/1981 | Germany . |
| 151723 | 11/1981 | Germany . |
| 556636 | 2/1957 | Italy . |
| 150823 | 9/1986 | Japan . |
| 197810 | 10/1978 | United Kingdom . |
| 673517 | 7/1979 | U.S.S.R. . |

*Primary Examiner*—Robert J. Oberleitner
*Assistant Examiner*—Gary C. Hoge
*Attorney, Agent, or Firm*—Low and Low

[57] ABSTRACT

A plurality of spaced louvers in an airflow control system on top of a tractor cab open up to permit a flow of air to impinge on the front face of the trailer to exert a braking force to augment the braking force exerted by the wheel brakes to slow down the tractor-trailer assembly. The louvers are under the control of the operator to be responsive to manual control, or to selective automatic control from the brake pedal, accelerator pedal, engine operation, or other vehicle operational equipment.

9 Claims, 6 Drawing Sheets

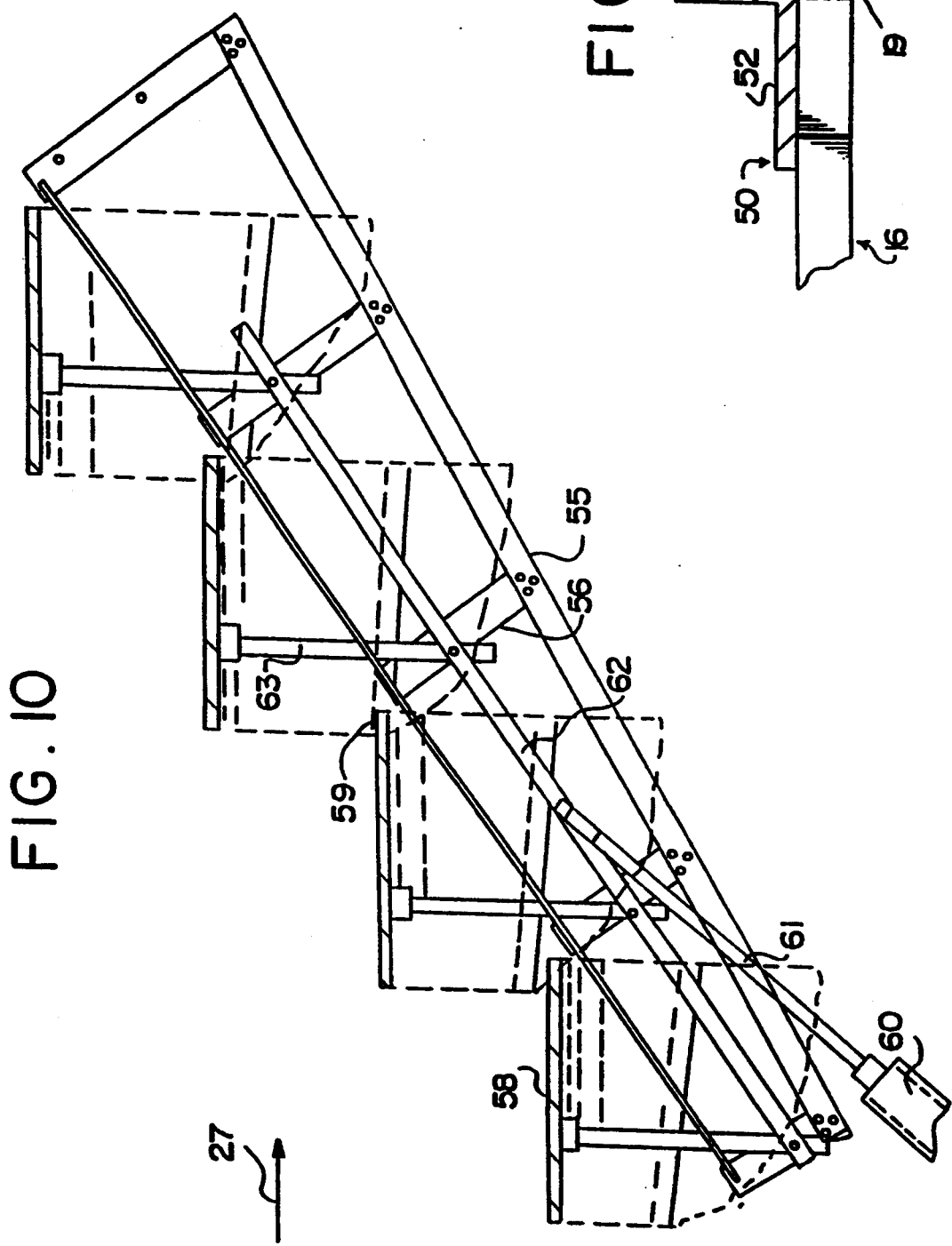

CONTROLS FOR TRACTOR-TRAILER AIR DEFLECTOR SYSTEM

CROSS-REFERENCE TO RELATED APPLICATION

This application is a continuation-in-part of Ser. No. 07/545,989, filed Jun. 29, 1990, now U.S. Pat. No. 5,092,648 granted Mar. 3, 1992, and which in turn is a continuation-in-part of Ser. No. 07/392,019, filed Aug. 10, 1989, now abandoned.

BACKGROUND OF THE INVENTION

With the inception of the tractor-trailer vehicles, the tractor vehicle was relatively low to the ground as compared to the trailer unit which was high and boxy to include as much volume as the law would permit for the carrying of cargo. As a result, the air flow impinging on the trailer at high speeds exerts a high degree of force, particularly if a strong head wind existed. Streamline panels or structures have been developed for tractor cab mounting to reduce this airflow drag. This, however, coupled with long downhill grades can be a dangerous situation because more braking effort is now required to slow down or stop these vehicles than was required before the streamline panel improvements were made.

DESCRIPTION OF THE RELATED ART

Efforts have been made to utilize the air flow striking the trailer unit to reduce the speed of the rig. One of the early developments seeking to reduce the braking force required is Stamm U.S. Pat. No. 2,863,695 of 1958 in which an effort was made to deflect and guide the air flow from the tractor unit to the trailer unit to change its course and direct air to flow to a trailer mounted element on top of the trailer.

Peairs U.S. Pat. No. 4,607,874 has a shield mounted transversely on the top of the tractor cab which could be moved angularly depending on the speed at which the vehicle is driven to deflect the air flow to project it over the top of the trailer to reduce the resistance involved.

Massengill U.S. Pat. No. 4,693,506 improved upon the Stamm and Peairs patents, but is quite limited in the operator's control of the air deflectors, thereby limiting its versatility. Additionally, the provision of a mounting bracket and a streamline housing is not contemplated.

SUMMARY OF THE INVENTION

Briefly summarized, this invention pertains to the use of a multi-louvered streamline fairing adapted to be positioned on the cab of the tractor forwardly of the trailer to streamline the flow of air over the trailer with the minimum of disturbance and resistance when the louvers are closed, and wherein when the louvers open up as controlled by the operator, as upon the application of the brakes, release of the accelerator, or otherwise, permit the air to impact on the front surface of the trailer to cooperate with the wheel brakes to decelerate the vehicle.

Another important feature of my invention is to provide an air deflector mounting bracket having a plurality of hingedly mounted front and side gates or louvers mounted in sturdily built mounting structure capable of fitting a wide range of tractor units.

BRIEF DESCRIPTION OF THE DRAWINGS

The invention will be better understood in connection with the accompanying drawings, in which:

FIG. 10 is a sectional view illustrating the means for actuating the movable gates in the air deflector mounting bracket;

FIG. 11 is a sectional view illustrating a portion of the movable gate actuating mechanism.

DESCRIPTION OF THE PREFERRED EMBODIMENT

Figure 1:
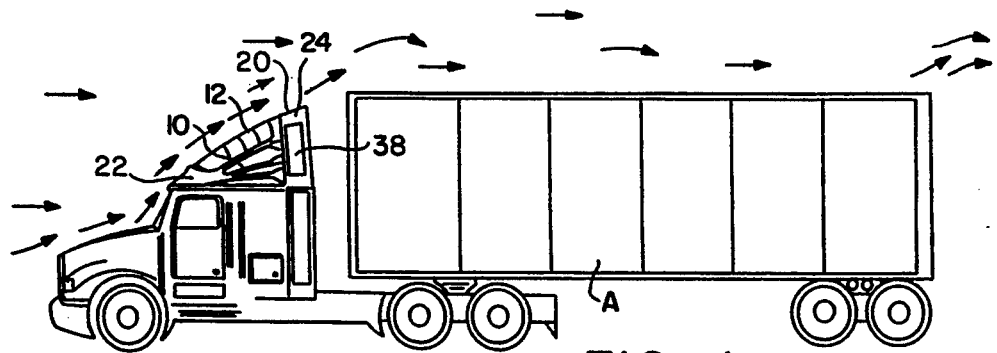
FIG. 1 is a side elevational view of a tractor-trailer vehicle with the air deflector door panels closed.
Figure 2:
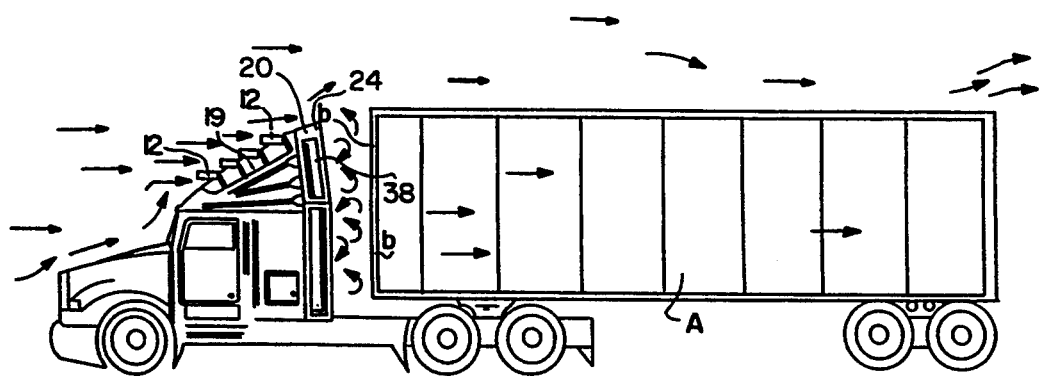
FIG. 2 is a side elevational view of the tractor-trailer vehicle illustrated in FIG. 1 with the door bracket opened.
Figure 3:
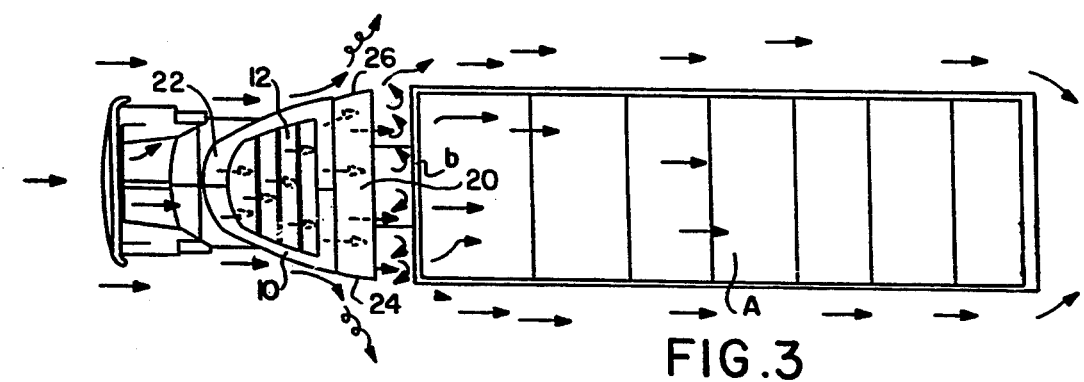
FIG. 3 is a plan view of the tractor-trailer vehicle illustrated in FIGS. 1 and 2 with the air deflector variable door panels open.

A generally triangular shaped mounting bracket 10 is adapted to be positioned on top of the cab of the truck unit illustrated in FIGS. 1, 2 and 3 of a vehicle tractor to deflect the air passing the truck, and to minimize the resistance of the air flow as the air reaches and passes the trailer unit having a substantially flat vertical face b of trailer unit A as the air is deflected to flow around the trailer unit A.

Figure 12:
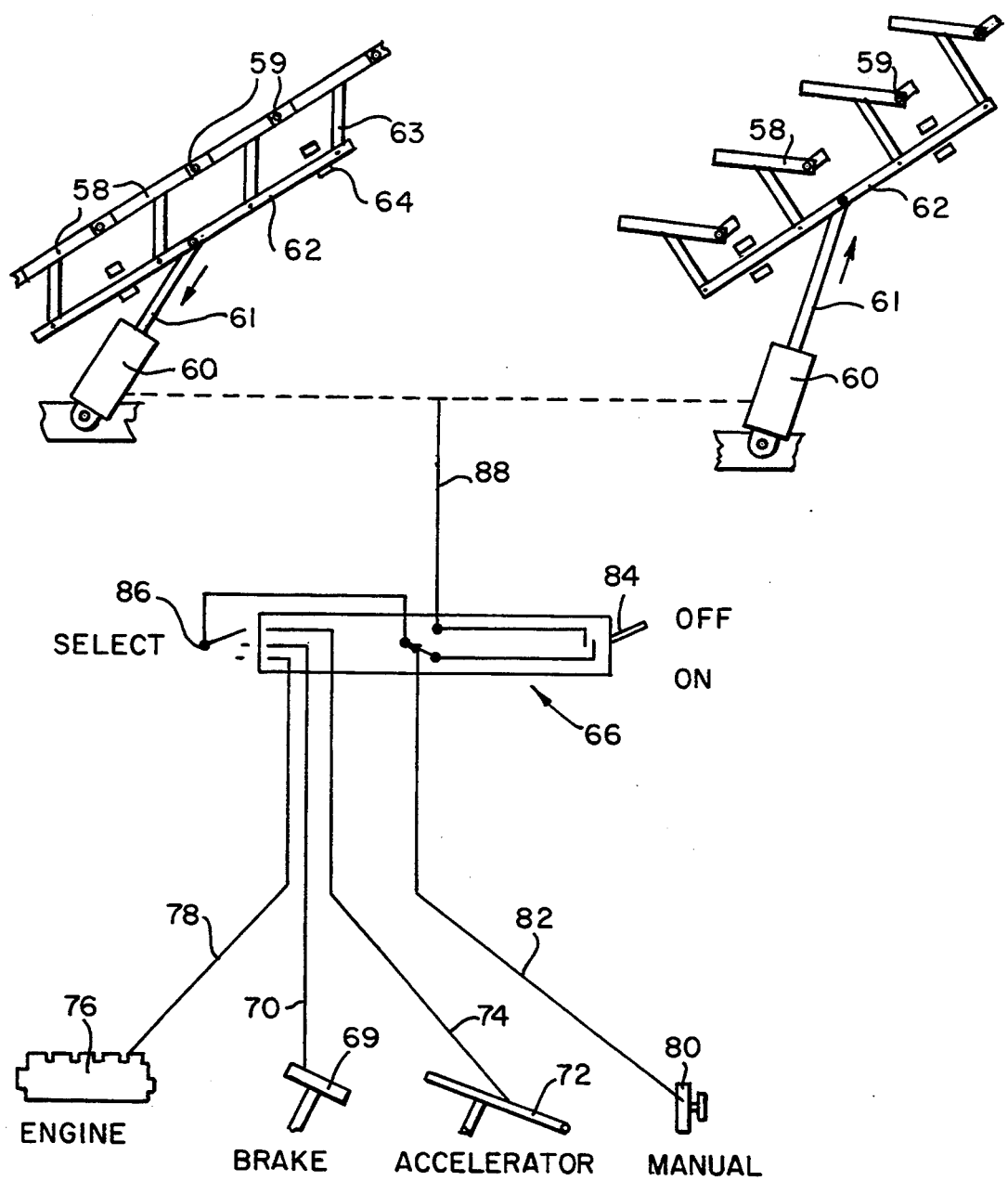
FIG. 12 is a diagramattic view of the control means for the air-deflecting louvers.

The central part of the mounting bracket 10 has a plurality of hingedly mounted gates or louvers of an air braking system 12 which gates are hinged at the rear or upper ends of the gates as shown in FIG. 1, which as described more fully hereinafter, and on control of the operator pivot forwardly by actuation of a rod 61 of a housing or cylinder 60 as seen in FIGS. 10 and 12 through linkages 62 and 63 to open up the opening 19 as shown in FIG. 2 in the mounting bracket 10 to permit the wind developed by the momentum of the vehicle to impinge directly with full force on the substantially flat front face b of the trailer. To this end, elongated control link 62 is slidably mounted as at 64, FIG. 12 and pivotally connected to rod 61 and has pivot connections to the several links 63 pivotally or otherwise secured to the individual louvers of the housing. At the same time the gates 38 hinged at the back in sub-housing side walls 24 and 26 as illustrated in FIGS. 1 and 2 of the mounting bracket 10 open up to admit even more air to impinge on the front face b of the trailer unit to increase the braking effort by the air flowing by the vehicle.

Figure 4:
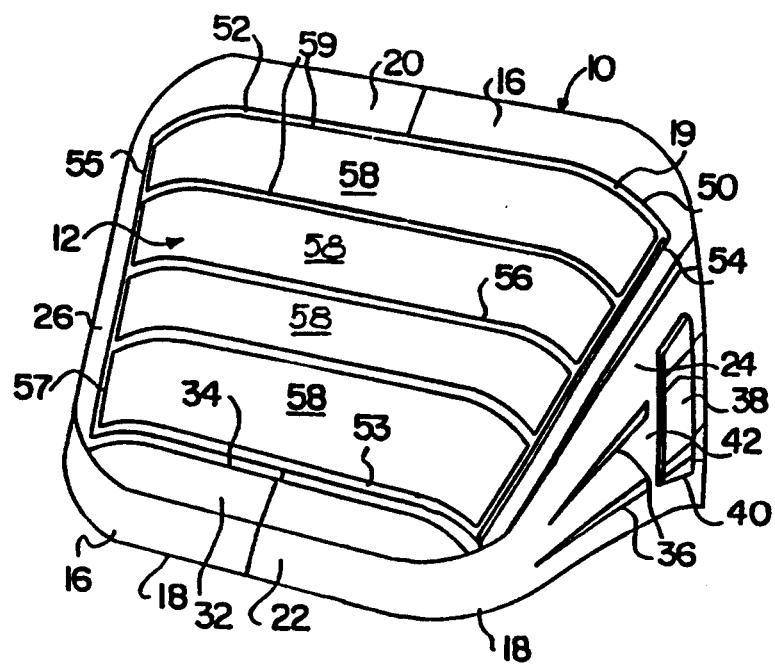
FIG. 4 is a front quarter perspective view of an air deflector mounting bracket shown in the closed position and embodying the present invention.
Figure 5:
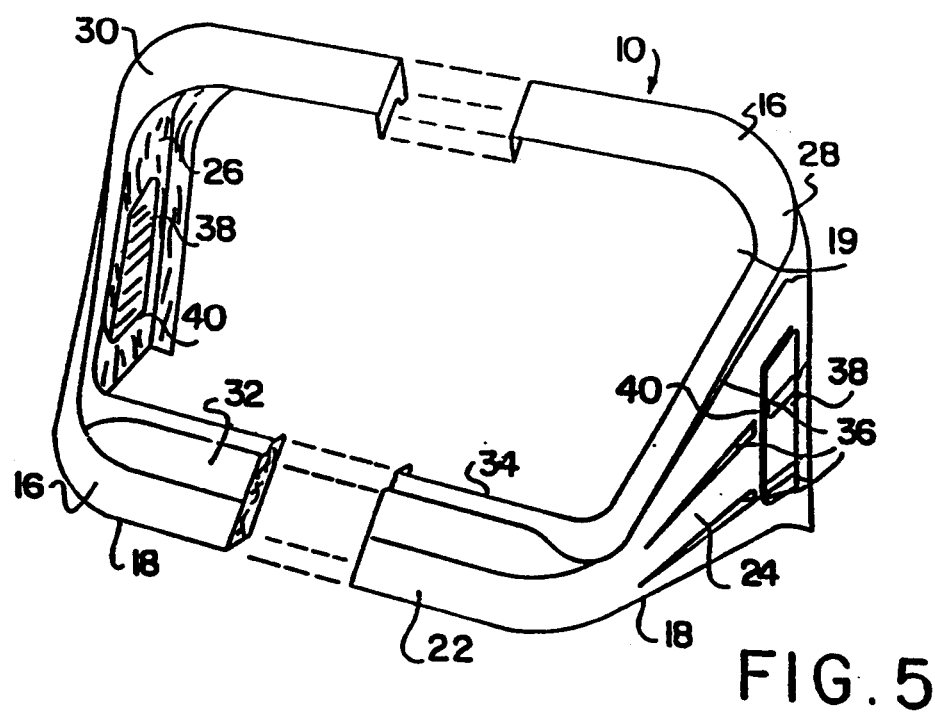
FIG. 5 is a perspective exploded view in quarter front elevation of the mounting bracket embodying the present invention.
Figure 6:
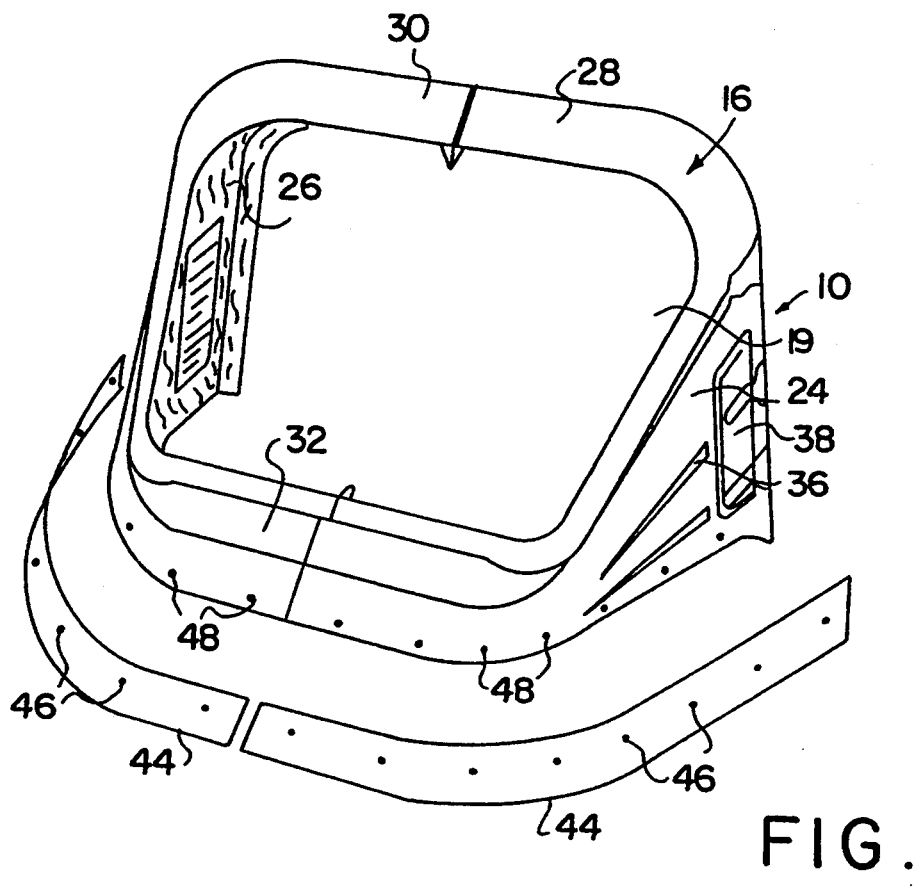
FIG. 6 is an exploded side elevational view of the mounting bracket illustrated in FIG. 4 and 5.
Figure 7:
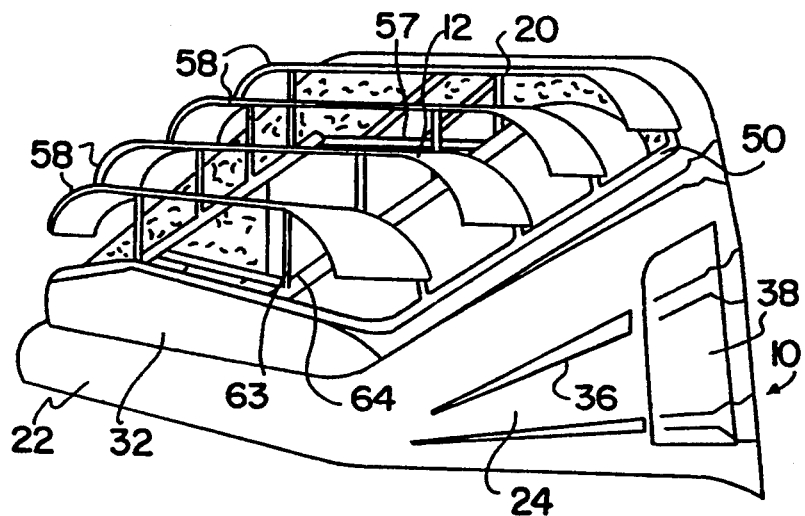
FIG. 7 is a perspective view of the air deflector mounting bracket showing the movable gates in the open position to exert a force on the front of the trailer to decelerate the vehicle.

Attention is directed to the fact that the mounting bracket 10 has a body 16 having a lower edge portion 18 which is adapted to be secured on top of the cab. The rearwardly and upwardly disposed opening 19 is defined by the upper and lower members 20 and 22 as illustrated in FIGS. 1, 3 and 4, and by the oppositely disposed portions 24 and 26 as seen in FIGS. 4, 5 and 6, and the body 16 is divided into first and second oppositely disposed sections 28 and 30 which are joined substantially midway of the upper portion 20 and the lower portion 22.

In the preferred embodiment the mounting bracket 10 is provided on its lower face with a spoiler 32 extending substantially the full length of the lower edge 34 of the opening 19. The spoiler 32 of FIG. 5 directs the air flow over the leading edge of the air deflector to avoid any drag that might otherwide be generated in the area where the leading edge of the air deflector engages the mounting bracket 10.

Also the side portions 24 and 26 as seen in FIGS. 4, 5, 6 and 7 can be provided with a system of stabilizer fins 36 to straighten out the air flowing around the side of the mounting bracket. The fins 36 also serve to stabilize the air collected by the doors 38 provided in the side portions 24 and 26. The doors 38 are hinged along their back sides to open up and deflect air from along the sides 24 and 26 to cause more air to be deflected inwardly to impinge on the front face b of the cargo carrying trailer units.

Similar mechanisms to those of FIGS. 10–12 for the top louvers are to actuate the side gates 38 to impinge and scoop up air to add to the braking effort of the air actuated braking system.

FIG. 6 shows the manner in which the mounting bracket 10 is provided with a contouring jacket 44 which may be secured to the lower edge portion 16 of the bracket 10 to adapt the mounting bracket 10 to the variable contours of different cab units to which it is desired to mount the bracket 10.

As illustrated in FIG. 6 the jacket 44 can be provided in two sections and holes 46 designed to register with holes 48 in the body 16 for receiving releasable fasteners for securing the mounting bracket 10 to various cabs of different tractor vehicles.

As stated previously herein, the mounting bracket 10 can support and receive the movable louvers 12 as illustrated in FIG. 1 to open up together with the side gates 38 to exert the air flow at road speeds to impinge on the front face b of the cargo-carrying trailer to increase the braking effort exerted by the wheel brakes to reduce the speed of the rig.

It will thus be apparent that for economical operation a trucking organization can apply the mounting bracket 10 with the solid fairing 14 of FIG. 9, and then at a later date apply the hinged gates as shown in FIGS. 1, 3 and 6 to assist in the braking effort of the wheel brakes.

Figure 8:
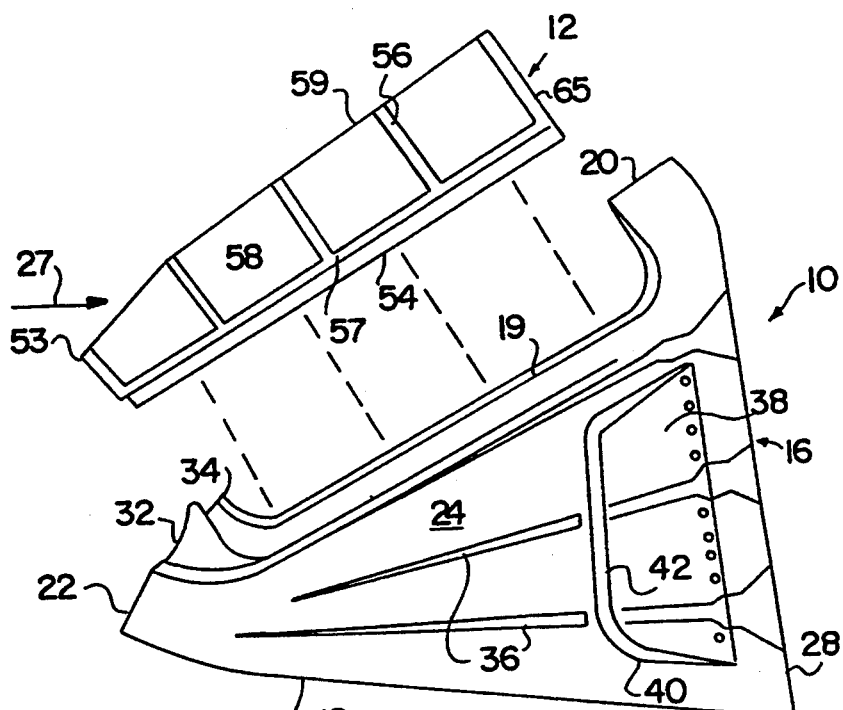
FIG. 8 is an exploded side elevational view illustrating the attachment of the air deflector panel to the cab of the tractor unit.
Figure 9:
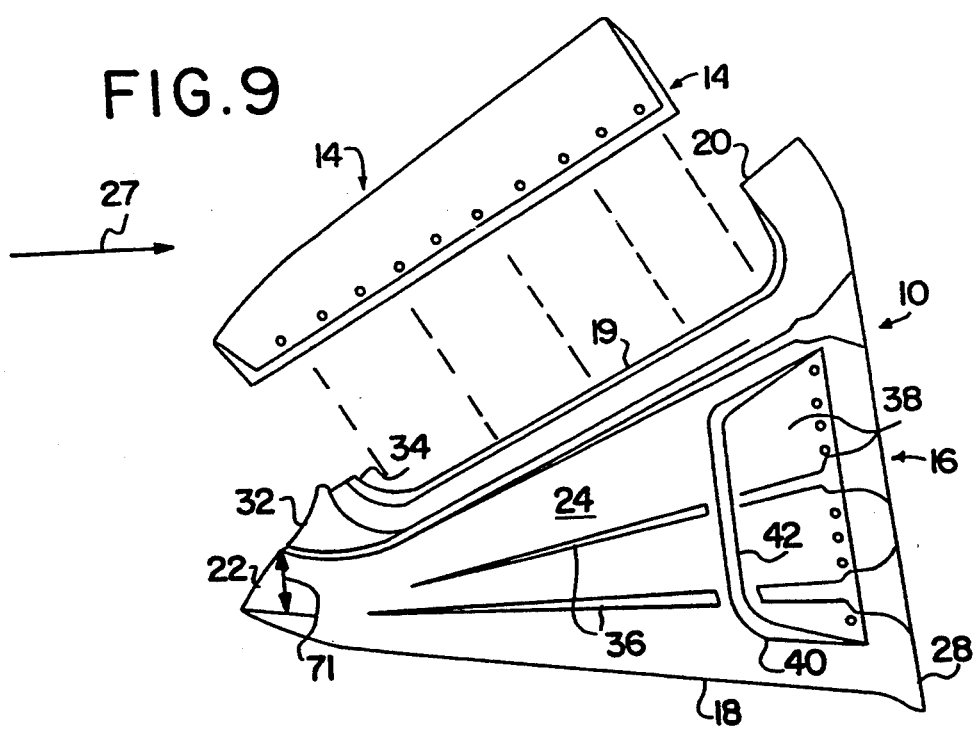
FIG. 9 is a view similar to FIG. 8 wherein a single air deflector panel is substituted for the movable gates disclosed in FIG. 7.

Referring now to FIG. 8 and 9, the air through which the tractor-trailer unit is moving is represented by the line 27. The angle of attack of the leading portion of the body 22 is disposed at approximately a 65 degree angle of attack of the air flow as illustrated at 27 in FIG. 8. The spoiler 32 defines a frontal surface disposed at an angle of approximately 70 degrees relative to the angle of attack represented by the air flow direction of attack 27 to direct the air flow over the lower portion of the air deflector means.

The braking device 12 comprises a frame 50 including an outer portion which is mounted in the central opening 19. The upper portion of the frame 50 includes an upper portion 52 and a lower portion 53 and a pair of side wing portions 54 and 55. As seen in FIG. 4, one or more cross members or ribs 56 extend between the side portions 54 and 55 to provide a plurality of openings 57, four such openings being illustratively shown. The frame 50 illustratively may be mounted to the frame 10 as seen in FIG. 11 by nut and bolt means 67, 68 extending through flanges of frame 50, as at 65 and connected to body 16 of mounting bracket 10.

Pivotally mounted in each of the openings 57 in the central opening 19 is a variable inlet door or louver 58 which adjustably closes the openings 57 in frame 50 disposed in the central opening 19. Each of the louvers 58 is hingedly mounted at the top and is operably connected to the control system of the vehicle to open as selected when braking is desired. Each of the doors or gates 58 is operably connected to the housing with a rear hinge 59, which if desired can be a hinge of the piano type to provide a strong hinged section that is movable between the closed position of FIGS. 1 and 4 to the open position shown in FIG. 7. When the doors 58 are opened the full air dependent on the speed of the vehicle is directed through the openings 57 to impact against the front face b of the trailer A, thereby exerting the maximum force dependent on the speed of the vehicle tractor-trailer. It will, of course, be understood that the maximum braking force will be exerted on the front face b of trailer A when the louvers are in the fully open position. The unit 10 is made of strong and lightweight material such as aluminum of sufficient thickness to provide a desired margin of safety above the anticipated forces to be exerted thereon.

Referring now to FIG. 10 it will be noted that when the air-braking is desired the rod 61 is extended from housing 60 to the position illustrated in FIG. 10 whereupon the linkage consisting of the links 62 and 63 are actuated to move the louvers 58 to the open position illustrated in FIG. 10. The air flow through which the truck-trailer is passing then flows through the open louvers 58 to impinge on the front surface b of the cargo carrying trailer A to exert a retarding or braking force to assist the wheel brakes in decelerating the truck and trailer vehicle.

When braking action is terminated, rod 61 is drawn back into the member 60 to actuate the linkage 62 and 63, and to close the louvers 58, whereupon the air flows in streamline over the mounting bracket 10 with minimal resistance being exerted on the front surface b of the trailer A.

The versatility of control of the louvers 58 is diagrammatically illustrated in FIG. 12, in which the louvers 58 are shown in both closed, streamline form and in open, air-braking position, in response to movement of louver links 63 and primary link 62.

As above indicated, housing 60 has rod 61 extending therefrom, wherein the member 60 is relatively pivotally fixed with respect to the overall bracket assembly. Rod 61 is advanced to open the louvers or retracted to close the louvers in the form shown. Obviously, these directions of movement could be reversed if desired. The power for motion of rod 61 is for simplicity preferably a fluid cylinder and piston arrangement at 60, 61, there being an ample supply of air or fluid pressure normally on the tractor vehicle to which the same may be connected. Alternatively, rod 61 may be the movable core of an electrical solenoid in housing 60, which may be either solenoid-advanced and spring retracted, or vice versa. In yet another form, rod 61 may be threadedly coupled to housing 60 whereby an electric motor rotating an axially fixed nut within housing 60 effects advance or retraction of the threaded rod 60, depending upon the direction of nut rotation.

Such fluid, electrical, and rotational motor drives to effect rod projection and retraction are well known in the art and are available from diverse commercial sources.

As set forth, such rod movement and louver motion is under the control of the tractor operator from a control unit 66, from which the tractor operator may disable the louver system, or select a desired mode of actuation. Thus, as is known in the art and as discussed in applicant's prior application Ser. No. 07/545,989 filed Jun. 29, 1990, now U.S. Pat. No. 5,092,648, operating members 60, 61 may be linked by conventional electrical, fluid or mechanical means to the usual vehicle brake pedal 69, whereby upon application of braking pressure to pedal 69, movement thereof is transmitted by line 70 to control unit 66, which if brake pedal 69 has been selected, in turn effects operation through line 88 from control unit 66, 70 to the louver operating members 60, 61 to control the louvers. As indicated, line 88 may be fluid or electrical and with motion or pressure sensors, as desired, depending upon the particular motor means at 60, 61.

There are instances when supplemental braking action by the airflow housing is desired before the vehicle brakes are actually applied by pedal 69, as when commencing a long and gradual downslope in which excessive speed is to be avoided. In such case, the vehicle accelerator pedal 72 is connected by line 74 to control unit 66 in the manner of brake line 70, whereby release of downward pressure alone on the pedal will actuate the louvers.

Yet another form of vehicle control may rely upon the braking action of the tractor engine when not under positive fuel feed. Indeed, especially with diesel engines, the cylinder compression ratios are so high, as compared to gasoline engines, that the engine provides substantial retarding force irrespective of any particular selected gear ratio, for example. Accordingly, engine 76 is connected similarly by a line 78 to control unit 66, whereby upon detection of the use of engine braking action, as by termination of fuel flow into engine cylinder injectors, line 78 will effect louver operation.

It will be seen that in like manner, other vehicle operational systems may be coupled to the louver operating means 60, 61, as from the gearbox or selected gear ratio, emergency actuated or deployed parachute braking means, or combinations of the foregoing, within the scope of the invention.

Irrespective of accelerator, brake pedal, or engine compression status, the operator may also manually effect control of the louvers by a suitable cab control 80 acting through like connection 82 to unit 66. In this regard, control unit 66 includes a master switch 84, whereby all systems may be disabled and no control whatever effected upon the louvers, and further includes a multiposition selector switch 86 which may be set by the operator as desired to include any one of the louver actuation systems available, or a combination thereof for safety and redundancy. As before, such multiple switch and selector systems are per se well known, and are adaptable into the particular unique control environment of the invention. Illustrative connections of a generally similar type but not involving the specific control system herein are shown, for example, in the Massengill patent.

What is claimed is:

1. An air deflector system comprising,
   a mounting bracket for mounting an air deflector louver assembly on a vehicle having plural vehicle control means, whereby said mounting bracket and deflector assembly serve to intercept the air flow on said vehicle during travel and redirect said air flow around aerodynamically inefficient surfaces of said vehicle to reduce drag on said vehicle,
   said mounting bracket comprising a body provided with a forwardly and upwardly disposed opening for closely receiving said air deflector louver assembly, said body including upper and lower portions and opposite side portions framing said opening in said body, and a lower edge portion for engaging said vehicle, wherein said mounting bracket is provided with a variable contouring jacket for adapting said bracket for mounting on vehicles having differing vehicle body contours, said jacket having an upper edge portion for engaging said lower edge portion of said mounting bracket body and having a lower edge portion for engaging said vehicle,
   operating means for moving said air deflector louver assembly between open and closed positions,
   an automatic control system for connecting said operating means to said plural vehicle control means whereby predetermined utilization of a said vehicle control means opens and closes said louver assembly to assist braking and slowdown action on said vehicle, and,
   means for selecting a said vehicle control means.

2. An air deflector system for mounting on a vehicle having plural vehicle control means, said system constructed to intercept the air flow encountering said vehicle during travel and redirect said air flow around aerodynamically inefficient surfaces of said vehicle, said air deflector system comprising:
   an air deflector mounting bracket, said mounting bracket having a body provided with a forwardly and upwardly disposed opening, said body including upper and lower portions and opposite side portions framing said opening in said body, and a lower edge portion for engaging said vehicle,
   air deflector louver means for being closely received in said opening in said mounting bracket body, wherein said air deflector louver means comprises an auxiliary air braking device, said braking device including;
   a frame including an outer frame portion for engaging said body of said mounting bracket about the perimeter of said opening of said body, said frame defining at least one louver opening,
   at least one variable inlet louver secured to said frame so as to serve as a closure for said louver opening,
   means mounting at least one said louver to be movable between closed and opened positions such that drag is reduced when said at least one louver is closed and said drag is increased when said at least one louver is open due to the air flow passing through said louver opening encountering said aerodynamically inefficient surfaces of said vehicle, operating means for selectively opening and closing said at least one louver, wherein said outer frame of said braking device includes upper and lower frame portions and a pair of oppositely disposed side portions, and said frame includes at least one rib extending between said side portions such that said frame defines a plurality of said louver openings, and wherein said braking device is provided with a plurality of said louvers, one said louver being operatively associated with each said louver opening, wherein one said louver is pivotally secured to said upper portion of said outer frame and at least another said louver is pivotally secured to said rib, an automatic control system connecting said operating means to said plural vehicle control means whereby predetermined utilization of a said vehicle control means opens and closes said louver to assist braking and slowdown action on said vehicle, and, means for selecting a said vehicle control means.

3. An air deflector system for mounting on a vehicle having plural vehicle control means, said system constructed to intercept the air flow encountering said vehicle during travel and redirect said air flow around aerodynamically inefficient surfaces of said vehicle, said air deflector system comprising:

an air deflector mounting bracket, said mounting bracket having a body provided with a forwardly and upwardly disposed opening, said body including upper and lower portions and opposite side portions framing said opening in said body, and a lower edge portion for engaging said vehicle, air deflector louver means for being closely received in said opening in said mounting bracket body, wherein said air deflector louver means comprises an auxiliary air braking device, said braking device including:

a frame including an outer frame portion for engaging said body of said mounting bracket about the perimeter of said opening of said body, said frame defining at least one louver opening, at least one louver secured to said frame so as to serve as a closure for said louver opening, means mounting said at least one louver to be movable between closed and opened positions such that drag is reduced when said at least one louver is closed and said drag is increased when said at least one louver is open due to the air flow passing through said louver opening encountering said aerodynamically inefficient surfaces of said vehicles, operating means for selectively opening and closing said at least one louver, wherein said outer frame of said braking device includes upper and lower frame portions and a pair of oppositely disposed side portions, and said frame includes at least one rib extending between said side portions such that said frame defines a plurality of said louver openings, and wherein said braking device is provided with a plurality of said louvers, one said louver being operatively associated with each said louver opening, wherein said outer frame defines a mounting flange for engaging and being secured to said body of said bracket proximate said perimeter of said opening of said body to facilitate the mounting of said braking device;

said operating means including means for moving a said louver between open and closed positions, an automatic control system connecting said operating means to said plural vehicle control means whereby predetermined utilization of a said vehicle control means opens and closes said louver to assist braking and slowdown action on said vehicle, and, means for selecting a said vehicle control means.

4. An air deflector system for mounting on a vehicle having plural vehicle control means, said system constructed to intercept the air flow encountering said vehicle during travel and redirect said air flow around aerodynamically inefficient surfaces of said vehicle, said air deflector system comprising:

an air deflector mounting bracket, said mounting bracket having a body provided with a forwardly and upwardly disposed opening, said body including upper and lower portions and opposite side portions framing said opening in said body, and a lower edge portion for engaging said vehicle;

air deflector means for being closely received in said opening in said mounting bracket body, wherein said air deflector means comprises an auxiliary air braking device, said braking device including:

a frame including an outer frame portion for engaging said body of said mounting bracket about the perimeter of said opening of said body, said frame defining at least one louver opening, at least one louver secured to said frame so as to serve as a closure for said louver opening, means mounting said at least one louver to be movable between closed and opened positions such that drag is reduced when said at least one louver is closed and said drag is increased when said at least one louver is open due to the air flow passing through said louver opening encountering said aerodynamically inefficient surfaces of said vehicle, operating means for selectively opening and closing said at least one louver, wherein said outer frame of said braking device includes upper and lower frame portions and a pair of oppositely disposed side portions, and said frame includes at least one rib extending between said side portions such that said frame defines a plurality of said louver openings, and wherein said braking device is provided with a plurality of said louvers, one said louver being operatively associated with each said louver opening, one said louver being operatively associated with each said louver opening, wherein one said louver is pivotally secured to said upper portion of said outer frame and at least another said louver is pivotally secured to said rib, wherein said operating means includes a fluid actuated cylinder having a reciprocating actuator arm, and further includes a linkage for communicating the selective movement of said actuator arm to said louvers so as to selectively open and close said louvers;

an automatic control system connecting said operating means to said plural vehicle control means whereby predetermined utilization of a said vehicle control means opens and closes said louver to assist braking and slowdown action on said vehicle, and, means for selecting a said control means.

5. An air deflector system for mounting on a truck-trailer vehicle having plural vehicle control means, said system constructed to intercept the air flow passing said vehicle during travel and redirect said air flow around the trailer of said vehicle, said air deflector system comprising:

an air deflector mounting bracket, said mounting bracket having:

a body provided with a forwardly and upwardly disposed opening, said body including upper and lower portions and opposite side portions framing said opening in said body, and a lower edge portion for engaging said vehicle, and air deflector means for being closely received in said opening of said mounting bracket body, a frame including an outer frame portion for engaging said body of said mounting bracket about the perimeter of said opening of said body, said frame defining a plurality of louver openings, at least one louver secured to said frame so as to serve as a closure for at least one said louver opening, means mounting said at least one louver to be movable between closed and opened positions such that drag is reduced when said louver is closed and said drag is increased when said at least one louver is open due to the air flow passing through said louver opening encountering said trailer of said vehicle, operating means for selectively opening and closing said at least one louver, wherein the outer frame of said air deflector means includes upper and lower frame portions and a pair of oppositely disposed side portions, and said frame including at least one rib extending between said side portions such that said frame defines a plurality of said louver openings, and wherein said air deflector means is provided with a plurality of said louvers, one of said louvers being operatively associated with each said louver opening, wherein said outer frame defines a mounting flange for engaging and being secured to said body of said bracket proximate said perimeter of said opening of said bracket body to facilitate mounting of said air deflector means, operating means for moving said louver between open and closed positions, an automatic control system connecting said operating means to said plural vehicle control means whereby predetermined utilization of a said vehicle control means opens and closes said louver to assist braking and slowdown action on said vehicle, and, means for selecting a said control means.

6. The air deflector system of claim 5 in which the truck-trailer vehicle plural vehicle control means include operator-actuated accelerator and brake pedals, and wherein said automatic control system is connected to said accelerator pedal and to said brake pedal, and, said automatic control system includes means whereby operator-application of accelerating force to said accelerator pedal closes said louver, and operator-release of said pedal opens said louver, and, said automatic control system includes means whereby operator-application of braking force to said brake pedal opens said louver and release of said pedal closes said louver.

7. The air deflector system of claim 5 in which the truck-trailer vehicle plural vehicle control means include a piston engine for the truck to provide power, and wherein said automatic control system is connected to said piston engine, and, said automatic control system includes means whereby an increase of speed of said engine closes said louver, and a decrease of speed of said engine opens said louver.

8. The air deflector system of claim 5 wherein said automatic control system includes manual control means connected thereto for opening and closing said louver.

9. The air deflector system of claim 5 further including means for disabling said automatic control system at the discretion of the operator thereby to preclude opening or closing of said louver.

* * * * *